United States Patent
Hensinger et al.

(10) Patent No.: US 11,285,409 B2
(45) Date of Patent: Mar. 29, 2022

(54) FILTER DEVICE

(71) Applicant: Mahle International GmbH, Stuttgart (DE)

(72) Inventors: Heiko Hensinger, Stuttgart (DE); Matthias Lindenberg, Stuttgart (DE); Uli Haeussermann, Fellbach (DE)

(73) Assignee: Mahle International GmbH

( * ) Notice: Subject to any disclaimer, the term of this patent is extended or adjusted under 35 U.S.C. 154(b) by 186 days.

(21) Appl. No.: 16/712,975

(22) Filed: Dec. 12, 2019

(65) Prior Publication Data
US 2020/0188822 A1   Jun. 18, 2020

(30) Foreign Application Priority Data
Dec. 14, 2018  (DE) .................. 10 2018 221 768.8

(51) Int. Cl.
*B01D 29/96* (2006.01)
*B01D 29/15* (2006.01)
(Continued)

(52) U.S. Cl.
CPC ............. *B01D 29/96* (2013.01); *B01D 29/15* (2013.01); *B01D 35/005* (2013.01);
(Continued)

(58) Field of Classification Search
CPC ...... B01D 29/96; B01D 29/15; B01D 35/005; B01D 35/1573; B01D 2201/167;
(Continued)

(56) References Cited

U.S. PATENT DOCUMENTS 6,936,169 B2   8/2005   Baumann et al.
7,531,090 B1   5/2009   Stamey, Jr. et al.
(Continued)

FOREIGN PATENT DOCUMENTS

| CN | 102648036 A | 8/2012 |
|---|---|---|
| CN | 102892475 A | 1/2013 |

(Continued)

OTHER PUBLICATIONS

Chinese Office Action dated May 14, 2021 for copending Chinese Patent Application No. 201911244433.0.
(Continued)

*Primary Examiner* — Madeline Gonzalez
(74) *Attorney, Agent, or Firm* — Fishman Stewart PLLC

(57) ABSTRACT

A filter device may include a filter housing, a ring filter element arranged within the filter housing, a tubular dome engaging in an interior of the ring filter element, and a valve arranged in a clean channel. The ring filter element may include a lower end disc and a pin. The ring filter element may engage a first channel via the pin. The tubular dome may have a guiding contour which may interact with a guiding element of the ring filter element. The guiding contour may include an axial groove. The pin may be introducible into the first channel when the guiding element enters the axial groove. The guiding element and the valve may be structured and arranged such that the guiding element interacts with a valve body of the valve and transfers the valve body into an opening position when the guiding element is slid into the axial groove.

20 Claims, 6 Drawing Sheets

(51) Int. Cl.
*B01D 35/00* (2006.01)
*B01D 35/157* (2006.01)

(52) U.S. Cl.
CPC .... *B01D 35/1573* (2013.01); *B01D 2201/167* (2013.01); *B01D 2201/291* (2013.01); *B01D 2201/4053* (2013.01)

(58) Field of Classification Search
CPC ...... B01D 2201/291; B01D 2201/4053; B01D 35/153; B01D 35/16; B01D 2201/298; B01D 2201/305; B01D 2201/316; B01D 2201/4007; B01D 29/58; B01D 29/21; B01D 29/13; F02M 37/48
USPC ................................ 210/234–235, 117, 136
See application file for complete search history.

(56) References Cited

U.S. PATENT DOCUMENTS

| | | | |
|---|---|---|---|
| 8,858,793 B2 | 10/2014 | Roesgen | |
| 9,205,355 B2 | 12/2015 | Deschamps et al. | |
| 9,254,456 B2 | 2/2016 | Ardes | |
| 9,320,992 B2 | 4/2016 | Braunheim | |
| 9,644,508 B2 | 5/2017 | Ardes | |
| 2003/0000882 A1 | 1/2003 | Harvey et al. | |
| 2009/0114588 A1 | 5/2009 | Bagci et al. | |
| 2014/0183116 A1* | 7/2014 | Ardes | B01D 29/88 210/234 |
| 2018/0257011 A1 | 9/2018 | Boden et al. | |
| 2019/0203674 A1 | 7/2019 | Hensinger | |

FOREIGN PATENT DOCUMENTS

| | | |
|---|---|---|
| CN | 104918675 A | 9/2015 |
| DE | 199 51 085 A1 | 4/2001 |
| DE | 10 2009 049 868 A1 | 4/2011 |
| DE | 10 2010 011 290 A1 | 9/2011 |
| DE | 202011104691 U1 | 1/2012 |
| DE | 10 2011 077 798 A1 | 12/2012 |
| DE | 102015222359 A1 | 5/2017 |
| EP | 3498359 A1 | 6/2019 |
| WO | 2018/087294 A1 | 5/2018 |

OTHER PUBLICATIONS

EP Search Report dated Mar. 5, 2020 for copending European Patent Applicaiton No. EP 19 21 5665.

* cited by examiner

FILTER DEVICE

CROSS-REFERENCE TO RELATED APPLICATIONS

This application claims priority to German Patent Application No. DE 10 2018 221 768.8, filed on Dec. 14, 2018, the contents of which are hereby incorporated by reference in their entirety.

TECHNICAL FIELD

The present invention relates to a filter device, in particular an oil or fuel filter, having a filter housing comprising a filter housing bowl and a filter housing cover. In addition, the invention relates to a ring filter element and to a function carrier.

BACKGROUND

In generic filter devices, a pin axially projecting from a lower end disc is often arranged on a ring filter element for ensuring the use of an authorised ring filter element, by means of which the ring filter element, with mounted filter device, engages in a filter housing bowl-side channel and a commissioning of the filter device is exclusively possible in particular when the ring filter element used has the required pin in the correct location. By way of this, the use of non-authorised ring filter elements can be avoided in particular and because of this damage to for example an internal combustion engine prevented.

From DE 10 2009 049 868 A1 a generic filter device is known.

SUMMARY

The present invention deals with the problem of stating an improved or at least an alternative embodiment for a filter device of the generic type which favours the use of authorised ring filter elements.

According to the invention, this problem is solved through the subject of the independent claim(s). Advantageous embodiments are subject of the dependent claim(s).

The present invention is based on the general idea of complementing in a filter device known per se a first key-lock system formed by an in particular filter housing bowl-side channel and a pin on a ring filter element with a second such key-lock system and thereby increase the security of using authorised ring filter elements and significantly reducing the risk of potential engine failures. The filter device according to the invention, which can be formed for example as oil or fuel filter, has a filter housing with a filter housing bowl and a filter housing cover that can be in particular screwed to the same. In the filter housing, the previously described ring filter element is arranged, which on a lower end disc comprises an eccentrically arranged and axially projecting pin, by means of which, with mounted filter device, it engages in the first channel. In addition, a tubular dome is provided which with mounted filter device engages in an interior space of the ring filter element. On a free end of this tubular dome, i.e. on an upper end, a guiding contour is provided, which interacts with a guiding element arranged on the ring filter element. This dome-side guiding contour additionally comprises an axial groove towards which the guiding element is guidable during the mounting of the filter device and which is arranged relative to the pin in such a manner that the same is introducible into the first channel provided that the guiding element enters the axial groove. This represents the first key-lock system. Furthermore, the filter device comprises a clean channel via which a fluid filtered by means of the filter device is dischargeable. According to the invention, a valve with a valve seat and a valve body spring-preloaded against the same into a closing position is arranged. The guiding element of the ring filter element interacts with the valve body in such a manner that the guiding element, when being slid into the axial groove, does not only align the pin relative to the first channel but at the same time transfers the valve body into an opening position. Thus, the transferring of the valve body into an opening position through the ring filter element-side guiding element constitutes the second key-lock system. Thus, two such key-lock systems are generally provided with the filter device according to the invention which exclusively allow a functionally conforming operation of the filter device and the starting of an internal combustion engine when an authorised ring filter element is inserted. By enforcing such authorised ring filter elements, engine failures, for example through low-quality filter materials, can be avoided. In order to operate or open both key-lock systems, the ring filter element-side guiding element has to have a certain relative position relative to the pin and at the same time a shape which makes possible actuating the valve body and thus the opening of the valve in the clean channel.

In an advantageous further development of the solution according to the invention the dome forms the clean channel at least in certain regions and engages through the ring filter element into its interior space. Thus, the guiding contour can be arranged at the top on the clean channel or the dome just like the axial groove and the actual valve in the clean channel and thus in the interior space of the ring filter element. Purely theoretically it is obviously also conceivable that the dome and the clean channel only reaches up to a certain height in the interior of the ring filter element, wherein in this case the guiding element on the ring filter element has to be arranged correspondingly further down or correspondingly pulled further down.

In an advantageous further development of the solution according to the invention, the valve body comprises a valve body rod on which guiding elements for guiding the valve body rod in the clean channel are arranged. Such guiding elements can be for example radial collars which are interrupted in the circumferential direction or perforated, which enforce a coaxial guiding of the valve body rod in the clean channel and thereby offer a higher functional security of the valve.

Practically, the clean channel extends at least partly in a function carrier that can be inserted into the filter housing, wherein the valve is arranged in the region of the function carrier. Thus it is not only the clean channel but also the dome, which on its upper or free end comprises the guiding contour, that is integrated in the function carrier. This offers the major advantage that the valve can be supplied in the clean channel, i.e. preassembled in the function carrier and as prefabricated assembly for installation in the filter device.

Practically, an engagement contour, for example elastic engagement lugs, and in the clean channel, a mating engagement contour, in particular an undercut, are provided on the valve body rod so that the valve body rod slid into the clean channel and thus also the valve body is captively held by way of the engagement contour engaged with the mating engagement contour. Here, the engagement contour can be formed for example through engagement lugs projecting from the valve body rod radially to the outside while the mating engagement contour forms a collar in the clean channel radially projecting to the inside. By way of this, a comparatively simple preassembly of the valve in the clean channel without additional components is possible, namely regardless of whether the clean channel is arranged on the filter housing side or in a function carrier.

Practically, a coil spring is provided which preloads the valve body in its closing position. On the valve body, a retaining contour for retaining the coil spring is provided, wherein the retaining contour has a cruciform shape and wherein on at least two opposite wings of the retaining contour undercuts for fixing the coil spring are arranged. By way of the undercuts merely provided on two wings an assembly effort or a fixing effort and also an assembly force of the coil spring on the valve body can be kept low. By way of this, the assembly can be significantly simplified.

In an advantageous further development of the solution according to the invention, the guiding contour on the dome is formed in the manner of a circular ramp, wherein the axial groove is arranged between the highest and the lowest point of the ramp. On fitting the ring filter element, the same thus slides with its guiding element along the circular ramp until it reaches the axial groove and can be slid into the same, or slips into the same. This sliding-in or slipping-in can be generated for example by means of a screwing-on operation of the filter housing cover on the filter housing bowl. Alternatively it is also conceivable that the guiding contour on the dome is formed in the manner of a bevelled cannula, wherein at the lowest point the axial groove is arranged. In this case, a likewise particularly smooth feeding of the pin to the first channel can be achieved. In contrast with filter devices known from the prior art, in the case of which the ring filter element-side pin was often utilised as sliding element, the pin now no longer has to have such a sliding property and can therefore be formed for example also of an elastic material, in particular of rubber.

Furthermore, the present invention is based on the general idea of stating a function carrier for a previously described filter device having a tubular dome on the free end of which a guiding contour with an axial groove is provided, and having a clean channel in which a valve with a valve seat and a valve body that can be spring-preloaded against the same into a closing position is arranged. By way of this, a pre-fabricatable assembly of function carrier and valve can be created, as a result of which an assembly expenditure during the final assembly is reduced.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
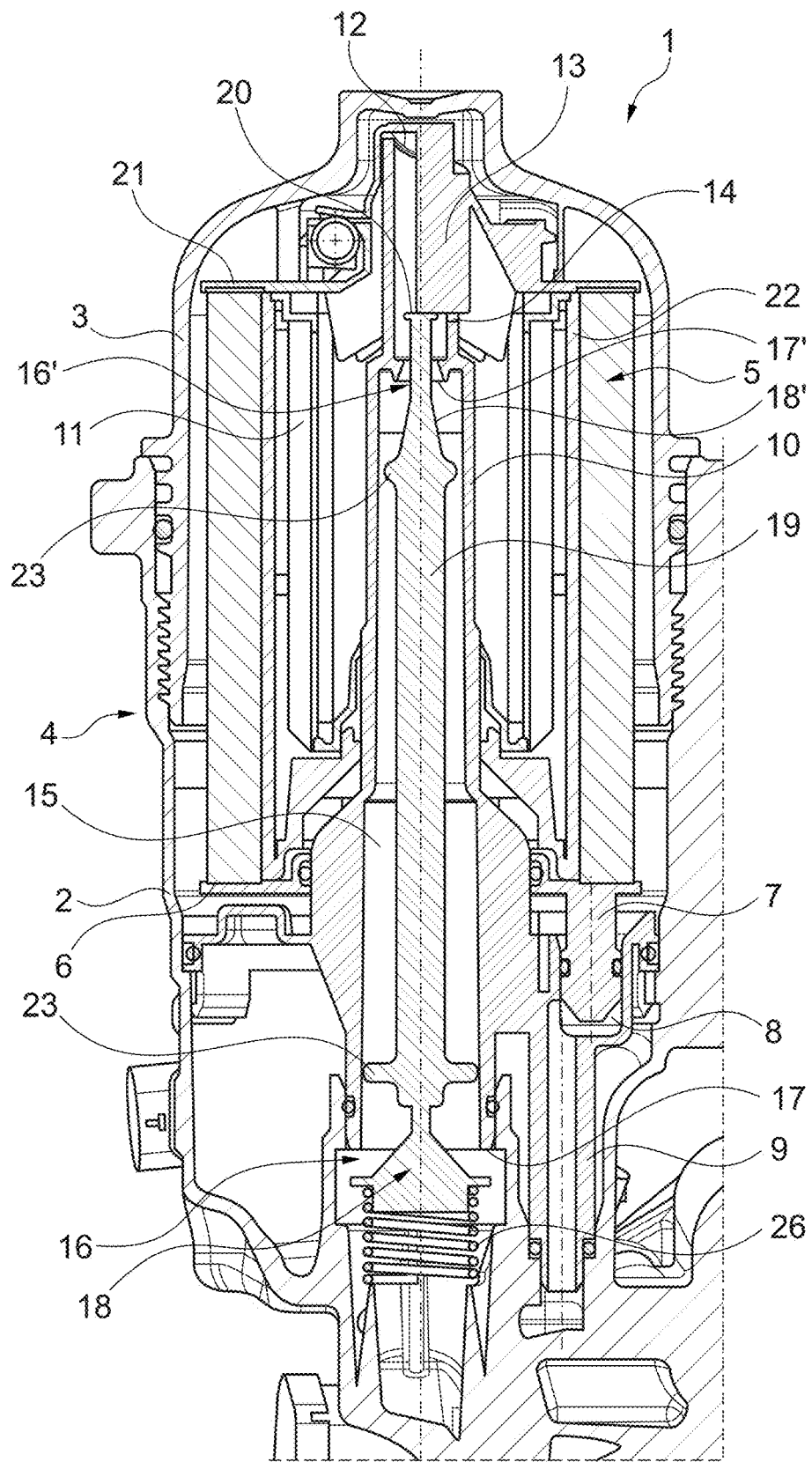
FIG. 1 shows a sectional representation through a filter device according to the invention with opened valve.
Figure 2:
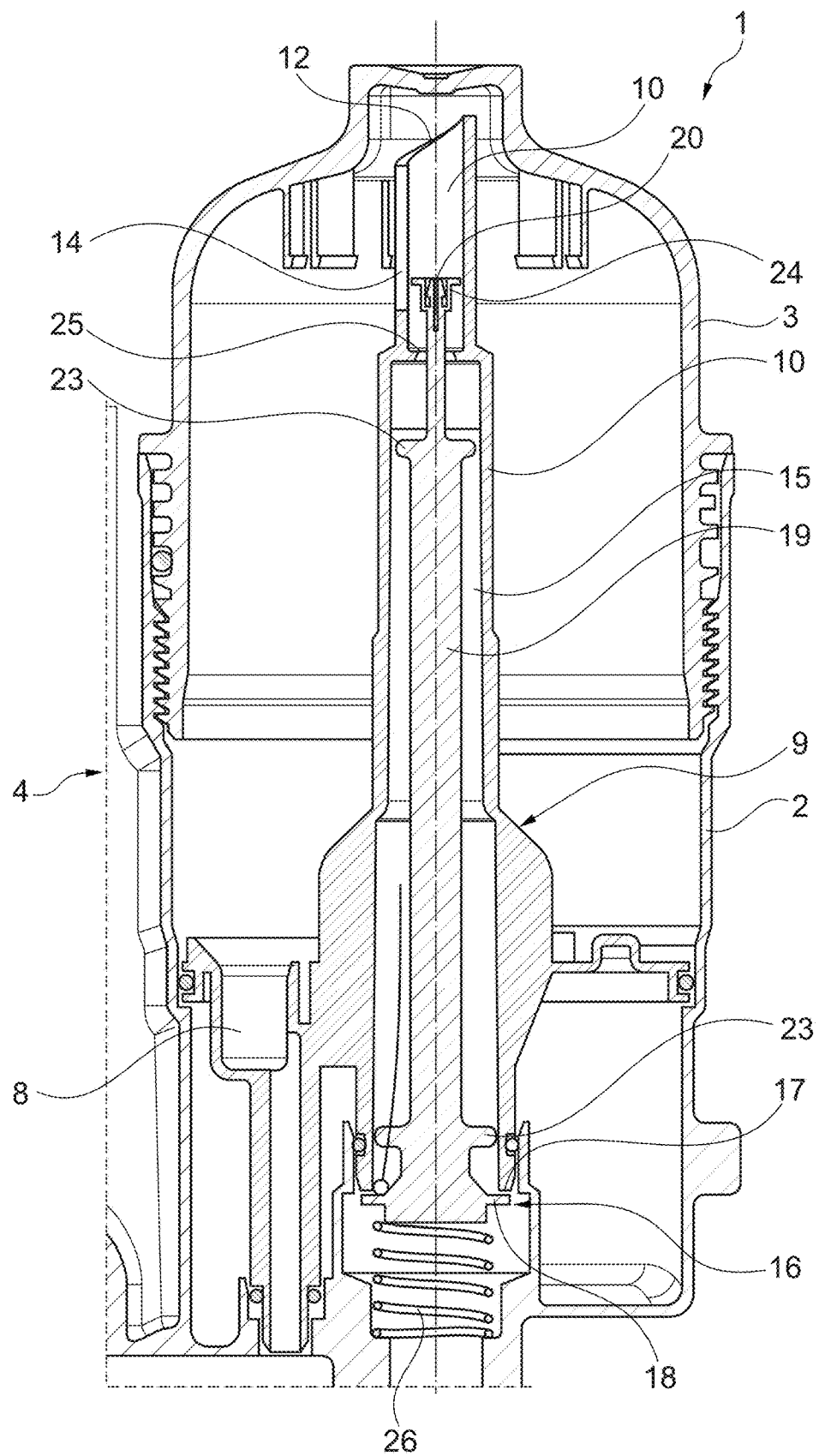
FIG. 2 shows a representation as in FIG. 1, however without inserted ring filter element and thus with closed valve.
Figure 3:
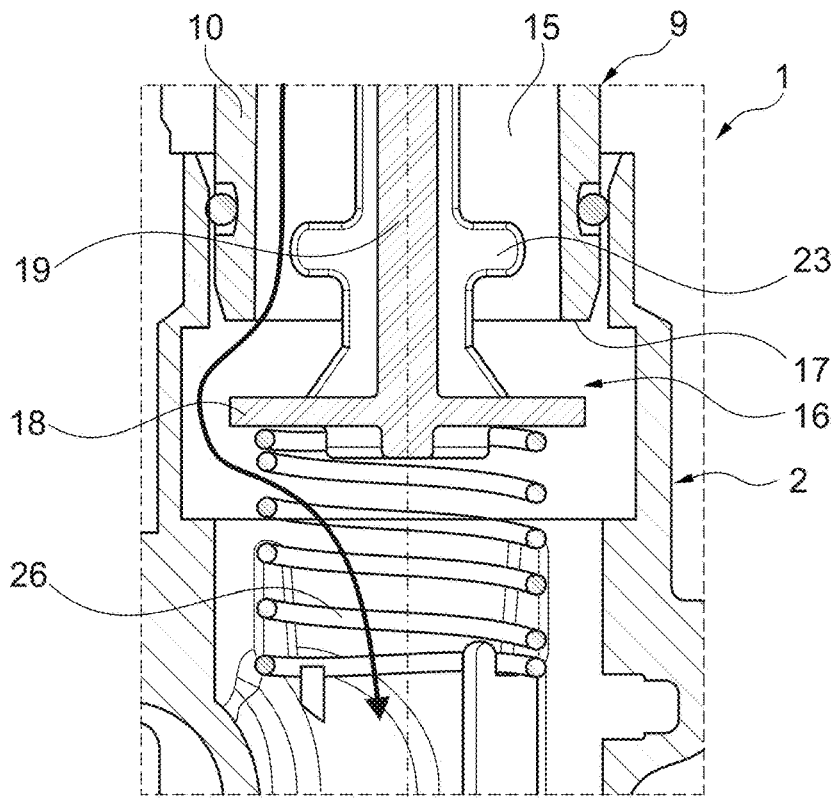
FIG. 3 shows a detail representation of the valve in the opened state from FIG. 1.

According to FIGS. 1 and 2, a filter device 1 according to the invention, which can be formed for example as oil or fuel filter, a filter housing 4 consisting of a filter housing 2 and a filter housing cover 3 screwed to the same, in which a ring filter element 5 (see FIG. 1) is arranged, which on a lower end disc 6 comprises an eccentric and axially projecting pin 7, by means of which the ring filter element 5 with mounted filter device 1 engages in a first channel 8. This first channel 8 can be arranged in the filter housing bowl 2 or in a function carrier 9. On the filter housing bowl 2 or on the function carrier 9, here on the function carrier 9, a tubular dome 10 is additionally arranged, which with mounted filter device 1 engages in an interior 11 of the ring filter element 5. On a free end of the tubular dome 10, here on its upper end, a guiding contour 12 is provided, which interacts with a guiding element 13 arranged on the ring filter element 5 and forms a first key-lock principle. The dome-side guiding contour 12 comprises an axial groove 14 towards which the guiding element 13 is guidable during the assembly of the filter device 1, wherein the axial groove 14 is arranged relative to the pin 7 so that the same is introducible into the first channel 8 exclusively in particular when the guiding element 13 enters the axial groove 14. The first key-lock principle is realised through the guiding element 13, the axial groove 14 and the pin 7 arranged relative to this in a predefined location.

According to the invention, a clean channel 15 for discharging filtered fluid is now additionally provided, in which a valve 16 with a valve seat 17 and a valve body 18 spring pre-loaded against the same into a closing position is arranged. According to the invention, the guiding element 13 now interacts with the valve body 18 or a part thereof in such a manner that the guiding element 13, when slid into the axial groove 14, transfers the valve body 18 into its opening position as is shown according to FIG. 1. Thus, the guiding element 13 together with the axial groove 14 and the valve body 18 forms the second key-lock system, which likewise has to be unlocked in order to ensure a functionally secure operation of the filter device 1.

Figure 4:
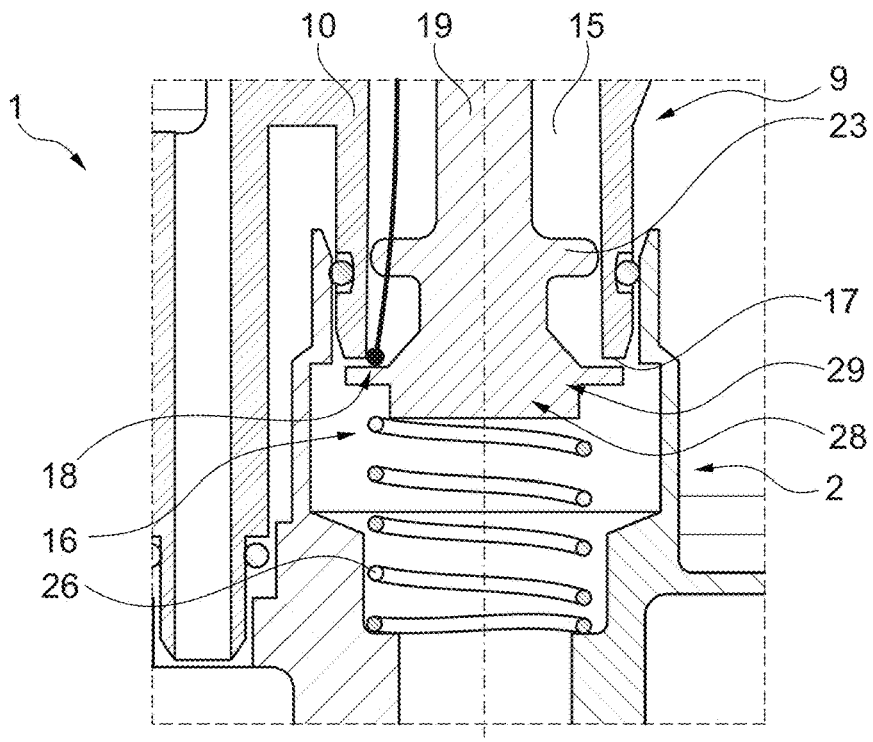
FIG. 4 shows a detail representation of the closed valve from FIG. 2.
Figure 5:
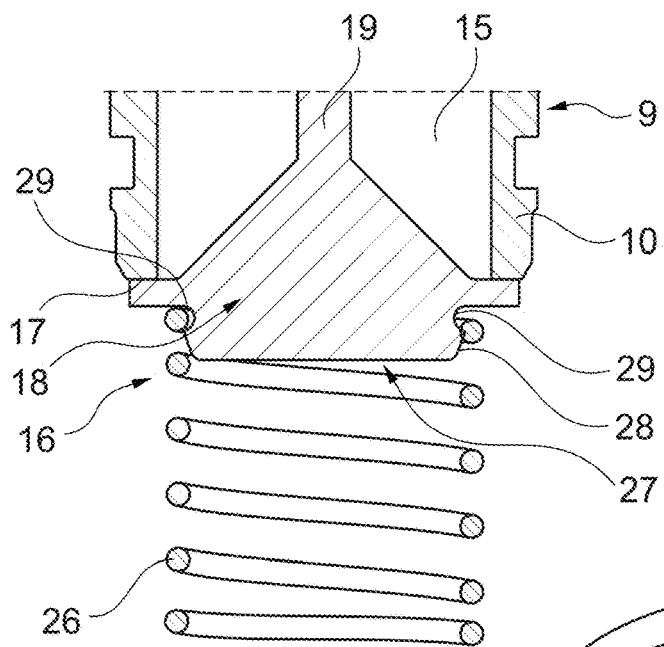
FIG. 5 shows a detail representation of a coil spring on the valve body.

Thus, when no ring filter element 5 is inserted in the filter device 1, as is shown according to FIGS. 2 and 4, neither the first channel 8 is closed nor the valve 16 opened, as a result of which no operation of the filter device 1 is possible.

Looking at FIGS. 1 to 5 as well as 7 and 8 further it is evident that the valve body 18 comprises a valve body rod 19 which substantially extends axially through the clean channel 15 and on its upper end has a stop surface 20 for the guiding element 13.

Here, the dome 10 forms the clean channel 15 at least in certain regions and engages through the interior 11 of the ring filter element 5. The guiding element 13 in turn is arranged on an upper, closed end disc 21 of the ring filter element 5 and in particular formed in one piece with the same. Alternatively it is also conceivable that the guiding element 13 is arranged on an inner frame 22 or on a lower end disc 6 of the ring filter element 5. The guiding element 13 can also have a lower stop in order to actuate the valve body rod 19 or the stop surface 20. In particular, the guiding element 13 can be arranged in the upper third/region, for example in the region of the upper end disc 21 of the ring filter element 5.

In addition, guiding elements 23 for guiding the valve body rod 19 in the clean channel 15 can be arranged on the valve body rod 19, wherein the guiding elements 23 can be formed for example as annular collars.

As already mentioned, the clean channel 15 can also extend at least partly in a function carrier 9 that is insertable in the filter housing 4, wherein in this case the valve 16 is arranged in the region of the function carrier 9. Beyond this it can be provided that in addition to the valve 16 a centring device 16' (see FIG. 1) is provided in the clean channel 15, wherein the same is arranged axially offset, in particular above the valve 16. Here, for example a conical introduction bevel 17' can be provided which facilitates a passing-through of the valve body rod 19 or the stop surface 20.

Figure 7:
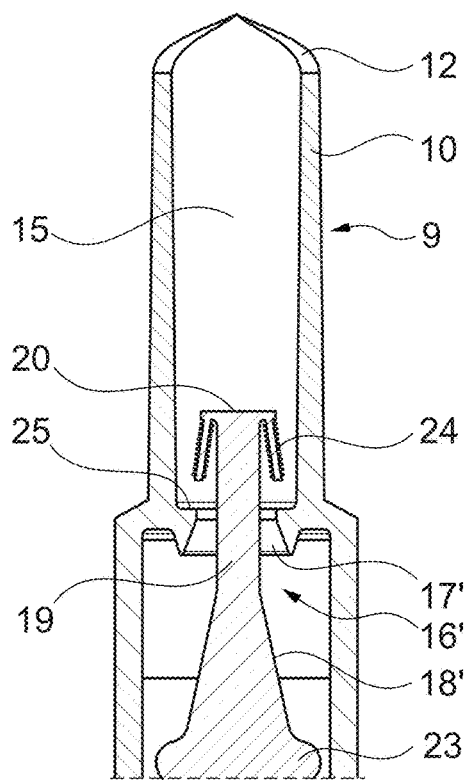
FIG. 7 shows a detail representation of a valve body engaged in the clean channel.
Figure 8:
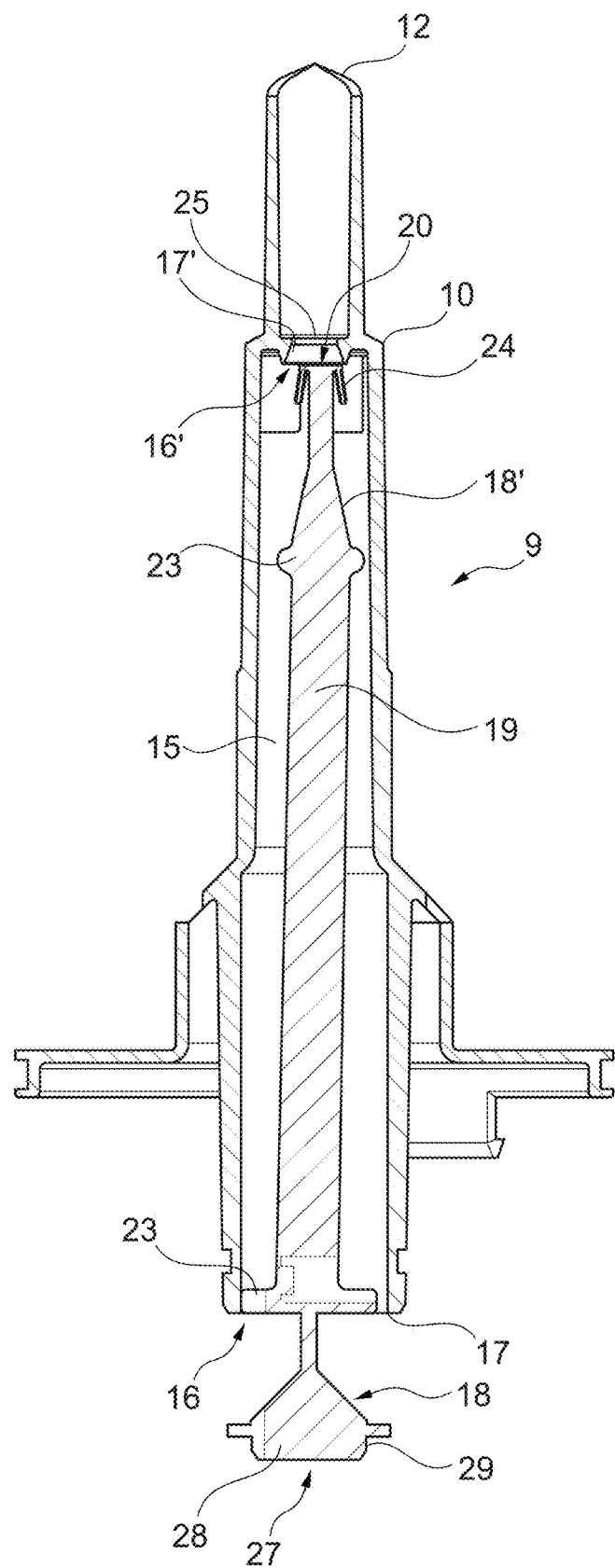
FIG. 8 shows a sectional representation through the clean channel with the valve body rod arranged therein.

Purely theoretically, the valve body rod 19 can also be formed as shown in FIG. 2, wherein in this case the valve body rod 19 has an engagement contour 24 which is formed in particular as elastic engagement lugs. A mating engagement contour 25 (see in particular also FIGS. 7 and 8) is provided for this in the clean channel 15, so that the valve body rod 19 and thus the valve body 18 slid into the clean channel 15 is captively held on the function carrier 9 by way of the engagement contour 24 engaged with the mating engagement contour 25.

Figure 6:
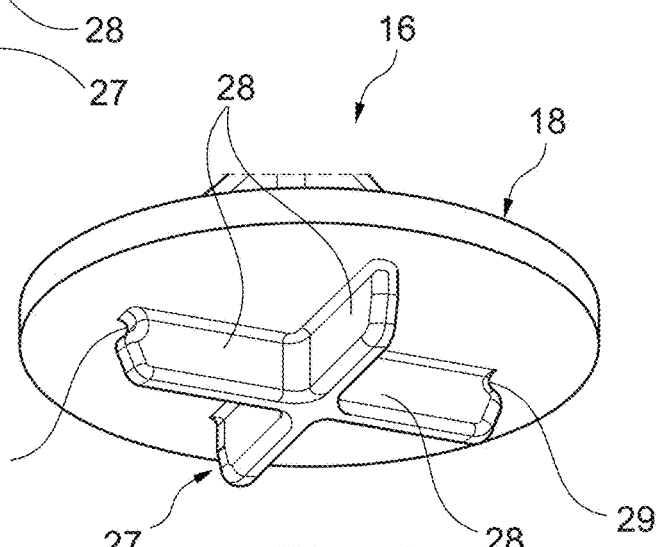
FIG. 6 shows a view of the valve body obliquely from below.

For preloading the valve body 18 into its closing position, a spring, in particular a coil spring 26 is provided, wherein on the valve body 18 a retaining contour 27 for retaining the coil spring 26 is arranged. The same has a cruciform shape (see FIGS. 5 and 6), wherein on at least two opposite wings 28 undercuts 29 for locking the coil spring 26 are arranged. By way of this, it is possible to comparatively easily clip the coil spring 26 onto the retaining contour 27 and thus fix the coil spring 26 on the retaining contour 27 or on the valve body 18. The undercuts 29 merely provided on two wings 28 facilitate assembling the coil spring 26 on the valve body 18.

Looking once more at the guiding element 13 the same can be formed for example as a guiding sword radially directed to the inside (see FIG. 1), wherein the guiding element 13 in this case is formed in one piece with the upper end disc 21 of the ring filter element 5. The guiding contour 12 can be formed in the manner of a circular ramp, wherein the axial groove 14 is arranged between the highest and the lowest point of the ramp, wherein it is alternatively also conceivable that the guiding contour 12 is formed in the manner of a bevelled cannula (see FIGS. 1, 2 as well as 7 and 8), wherein in this case the axial groove 14 is arranged at the lowest point.

Figure 9:
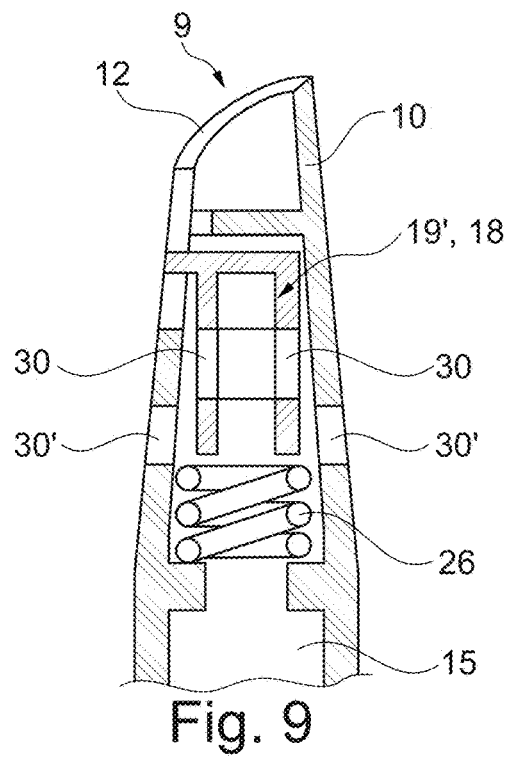
FIG. 9 shows a sectional representation through a clean channel with a sleeve as valve body.
Figure 10:
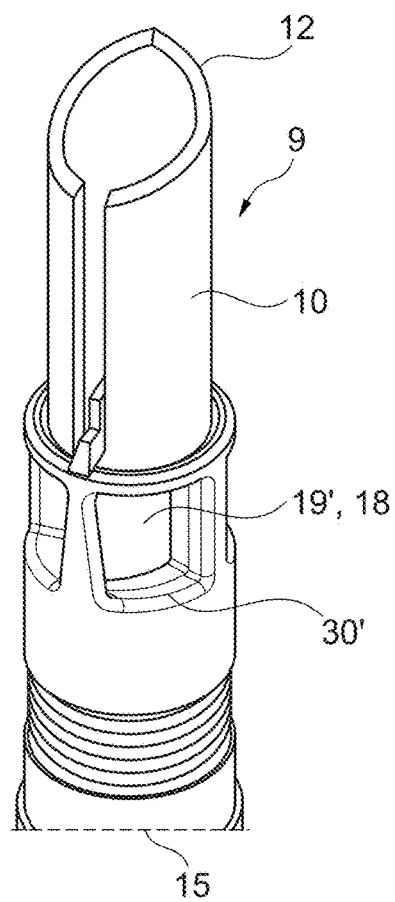
FIG. 10 shows a view of the upper part of the function carrier shown according to FIG. 9.

Looking at FIGS. 9 and 10 it is evident that the valve body 18 depicted there is a sleeve 19'. Here, the sleeve 19' comprises openings 30 on the outside, which in an open position are congruent with outside openings 30' in the tubular dome 10. Filtered liquid enters the clean channel 15 through a bottom-side opening in the sleeve 19'.

The function carrier 9 with the valve 16 arranged therein is to be likewise placed under protection with the present invention. A ring filter element 5, which on an upper end disc 21 or generally has such a guiding element 13 in an upper region adjoining the upper end disc 21 and which is insertable in the filter device 1 according to the invention is to be likewise placed under protection. Such a ring filter element 5 can be formed for example as fuel filter or as oil filter.

The invention claimed is:

1. A filter device, comprising:
 a filter housing including a filter housing bowl and a filter housing cover;
 a ring filter element arranged within the filter housing, the ring filter element including a lower end disc from which a pin axially projects, the ring filter element engaging a first channel via the pin;
 a tubular dome engaging in an interior of the ring filter element;
 a free end of the tubular dome having a guiding contour which interacts with a guiding element arranged on the ring filter element;
 the guiding contour including an axial groove towards which the guiding element is guidable during assembly, the axial groove arranged relative to the pin such that the pin is introducible into the first channel when the guiding element enters the axial groove;
 a clean channel;
 a valve including a valve seat and a valve body arranged in the clean channel, the valve body spring pre-loaded against the valve seat into a closing position; and
 wherein the guiding element and the valve are structured and arranged such that the guiding element interacts with the valve body and transfers the valve body into an opening position when the guiding element is slid into the axial groove.

2. The filter device according to claim 1, wherein the valve body includes a valve body rod.

3. The filter device according to claim 1, wherein the tubular dome defines the clean channel at least in certain regions and engages through the ring filter element into the interior of the ring filter element.

4. The filter device according to claim 1, wherein the ring filter element includes at least one of an upper, closed end disc and a support structure-like inner frame, and wherein the guiding element is arranged on the at least one of the upper, closed end disc and the support structure-like inner frame.

5. The filter device according to claim 2, wherein the valve body rod includes a plurality of guiding elements structured and arranged to guide the valve body rod in the clean channel.

6. The filter device according to claim 1, further comprising a function carrier insertable into the filter housing, wherein:
 the clean channel extends at least partly in the function carrier; and
 the valve is arranged in a region of the function carrier.

7. The filter device according to claim 2, wherein:
 the valve body rod has an engagement contour;
 a mating engagement contour is disposed in the clean channel; and
 the valve body rod and the valve body are secured within the clean channel via the engagement contour engaging with the mating engagement contour.

8. The filter device according to claim 1, further comprising a coil spring configured to preload the valve body into the closing position, wherein:

the valve body includes a retaining contour with a cruciform shape for retaining the coil spring; and the retaining contour includes a plurality of undercuts arranged on at least two opposite wings of the retaining contour, the plurality of undercuts configured to secure the coil spring.

9. The filter device according to claim 1, wherein the guiding element is structured as a guiding sword directed radially inward.

10. The filter device according to claim 1, wherein:
the guiding contour is structured as a circular ramp; and
the axial groove is arranged between a highest point of the circular ramp and a lowest point of the circular ramp.

11. The filter device according to claim 1, wherein:
the ring filter element further includes an upper, closed end disc and a support structure-like inner frame; and
the guiding element is arranged on at least one of the upper, closed end disc and the support structure-like inner frame.

12. The filter device according to claim 11, wherein the guiding element includes a lower stop configured to actuate at least one of a valve body rod and a stop face of the valve body.

13. The filter device according to claim 11, wherein the guiding element is arranged in a region of the upper, closed end disc.

14. The filter device according to claim 1, further comprising a function carrier including:
the tubular dome;
the clean channel; and
the valve.

15. The filter device according to claim 14, wherein:
the valve body includes a valve body rod;
the valve body rod includes a plurality of guiding elements structured and arranged to guide the valve body rod in the clean channel;

the valve body rod includes an engagement contour;
a mating engagement contour is disposed in the clean channel; and
the valve body rod and the valve body are secured within the clean channel via the engagement contour engaging with the mating engagement contour.

16. The filter device according to claim 14, wherein:
the valve body includes a retaining contour with a cruciform shape for retaining a coil spring of the filter device; and
the retaining contour includes a plurality of undercuts arranged on at least two opposite wings of the retaining contour, the plurality of undercuts configured to secure the coil spring.

17. The filter device according to claim 1, wherein the valve body is structured as a sleeve.

18. The filter device according to claim 2, wherein:
the valve body rod includes a plurality of elastic engagement lugs;
at least one undercut is disposed in the clean channel; and
the valve body rod and the valve body are secured within the clean channel via the plurality of elastic engagement lugs engaging with the at least one undercut.

19. The filter device according to claim 1, wherein the ring filter element further includes:
an upper, closed end disc; and
a support structure-like inner frame extending from the upper end disc to the lower end disc.

20. The filter device according to claim 1, wherein:
the guiding contour is structured as a bevelled tube; and
the axial groove is arranged at a lowest point of the bevelled tube.

* * * * *